US007627038B2

(12) United States Patent
Moni et al.

(10) Patent No.: US 7,627,038 B2
(45) Date of Patent: *Dec. 1, 2009

(54) METHODS AND SYSTEMS FOR COMPRESSING A VIDEO STREAM WITH MINIMAL LOSS AFTER SUBSAMPLED DECODING

(75) Inventors: Shankar Moni, San Jose, CA (US); John A. Tardif, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1155 days.

This patent is subject to a terminal disclaimer.

(21) Appl. No.: 10/968,529

(22) Filed: Oct. 19, 2004

(65) Prior Publication Data

US 2005/0053153 A1    Mar. 10, 2005

Related U.S. Application Data

(63) Continuation of application No. 09/886,693, filed on Jun. 18, 2001, now Pat. No. 6,868,124.

(51) Int. Cl.
*H04N 7/12* (2006.01)
*G06K 9/36* (2006.01)
(52) U.S. Cl. .................................. 375/240.21; 382/233
(58) Field of Classification Search ............ 375/240.21, 375/240.03, 240.27, 240.16, 240; 382/233; 348/565

See application file for complete search history.

(56) References Cited

U.S. PATENT DOCUMENTS

| 4,942,457 | A | 7/1990 | Keesen |
| 5,193,003 | A | 3/1993 | Kondo |
| 5,253,059 | A | 10/1993 | Ansari |
| 5,949,485 | A | 9/1999 | Oh |
| 6,243,421 | B1 | 6/2001 | Nakajima |
| 6,310,915 | B1 * | 10/2001 | Wells et al. ............ 375/240.03 |
| 6,333,952 | B1 * | 12/2001 | Lim et al. ............... 375/240.27 |
| 6,563,876 | B2 | 5/2003 | Boyce |
| 6,671,322 | B2 * | 12/2003 | Vetro et al. ............ 375/240.16 |
| 7,170,932 | B2 * | 1/2007 | Vetro et al. .................. 375/240 |
| 7,263,231 | B2 * | 8/2007 | Jiang et al. ................... 382/233 |

OTHER PUBLICATIONS

Yue Yu Jian Zhou and Chang Wen Chen, "A Fast Block Motion Estimation Algorithm Based on Combined Subsamplings on Pixels and Search Candidates" Image and Video Communications and Processing 2000, Proceedings of SPIE, Vo. 3974 (2000), pp. 835-843.

(Continued)

*Primary Examiner*—Gims S Phillippe
(74) *Attorney, Agent, or Firm*—Workman Nydegger (57) ABSTRACT

Transcoding of a video stream to reduce the size of the video stream with little, if any, loss in video quality after subsampling. After accessing a video stream of video pictures (i.e., video frames or fields), the blocks of the video picture are each subject to matrix pre-multiplication and post-multiplication. Such matrix multiplication does degrade the video quality if subsampling was not to occur. However, the pre-multiplication and post-multiplication matrices are calculated based on the subsampling matrices that will be used to ultimately subsample the video stream such that after subsampling eventually occurs, the matrix multiplications result in minimal loss of video quality.

23 Claims, 4 Drawing Sheets

OTHER PUBLICATIONS

Myung Jun Kim, Byung Cheol Song, Sung Kyu Jang, and Jong Beom Ra, "An Efficient Video Down Conversation Algorithm Using Modified IDCT Basis Functions" 0-7803-5467-2/99@ 1999 IEEE, pp. 914-918.

Robert Mokry and Dimitris Anastassiou, "Minimal Error Drift in Frequency Scalability for Motion-Compensating DCT Coding", IEEE Transactions on Circuits and Systems for Video Technology, vol. 4, No. 4, Aug. 1994, pp. 392-406.

Office Action dated Aug. 4, 2004 cited in U.S. Appl. No. 09/886,693.

Notice of Allowance dated Dec. 1, 2004 cited in U.S. Appl. No. 09/886,693.

* cited by examiner

FIG. 1A *(PRIOR ART)*
DISPLAY ORDER

FIG. 1B *(PRIOR ART)*
DECODE ORDER

METHODS AND SYSTEMS FOR COMPRESSING A VIDEO STREAM WITH MINIMAL LOSS AFTER SUBSAMPLED DECODING

CROSS-REFERENCE TO RELATED APPLICATIONS

The present application is a continuation application of commonly-assigned U.S. patent application Ser. No. 09/886,693 filed Jun. 18, 2001, entitled "Methods and Systems for Compressing a Video Stream with Minimal Loss After Subsampled Decoding" and which is incorporated herein by reference.

BACKGROUND OF THE INVENTION

1. The Field of the Invention

The present invention relates to the field of video processing. In particular, the present invention relates to the compression of a video stream when it is known that the video stream is to be subsampled for minimal loss after subsampled decoding.

2. Background and Related Art

Video constitutes a series of images that, when displayed above a certain rate, gives the illusion to a human viewer that the image is moving. Video is now a widespread medium for communicating information whether it be a television broadcast, a taped program, or the like. More recently, digital video has become popular.

An uncompressed digital video stream has high bandwidth and storage requirements. For example, the raw storage requirement for uncompressed CCIR-601 resolution 4:2:2: serial digital video is approximately 20 megabytes per second of video. In addition, associated audio and data channels also require bandwidth and storage. From a transmission bandwidth perspective, 20 megabytes per second is much faster than conventional transmission techniques can practicably support. In addition, from a storage perspective, a two-hour movie would occupy approximately 144 Gigabytes of memory, well above the capabilities of a conventional Digital Versatile Disk (DVD). Therefore, what were desired were systems and methods for compressing (or coding) digital video in a way that maintains a relatively high degree of fidelity with the original video once uncompressed (or decoded).

One conventional high-quality compression standard is called MPEG-2, which is based on the principle that there is a large degree of visual redundancy in video streams. By removing much of the redundant information, the video storage and bandwidth requirements are significantly reduced.

Figure 1A:
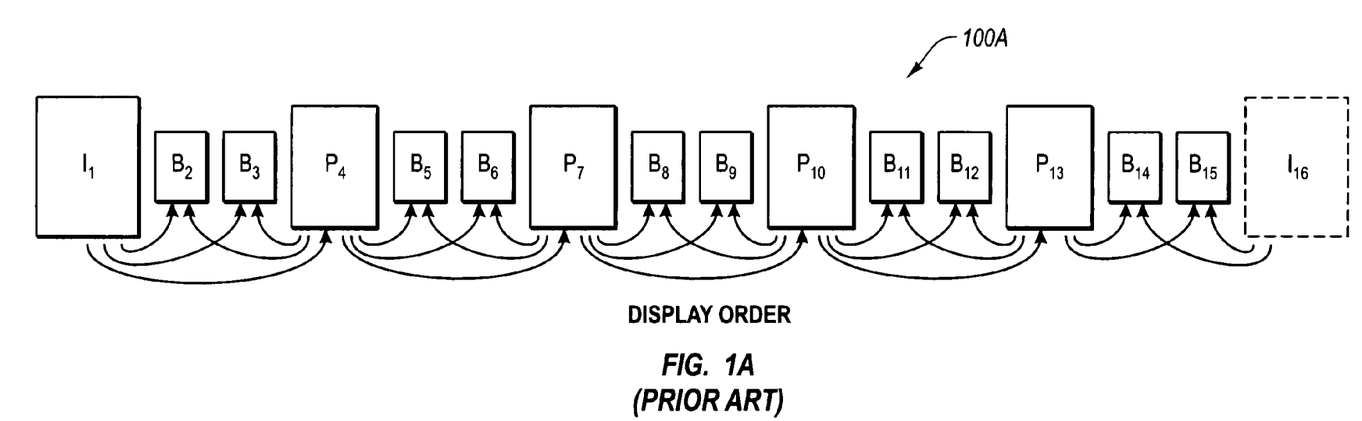
FIG. 1A illustrates a display order of an MPEG-2 video stream in accordance with the prior art.

FIG. 1A illustrates a display order 100A of a sequence of pictures. If the video stream represents progressive video, the pictures represent individual progressive frames. If the video steam represents interlaced video, the pictures represent individual interlaced frames containing two fields each.

Under the MPEG-2 standard, there are three classes of pictures, I-pictures, P-pictures and B-pictures. While MPEG-2 allows for a number of display orders for groups of pictures, the display order illustrated in FIG. 1A is commonly used. In this common display order, there are a series of I-pictures. For clarity, only I-pictures I1 and I16 are shown in FIG. 1A. Each consecutive I-picture pair has four P-pictures interspersed there between. For example, P-pictures P4, P7, P10 and P13 are interspersed between consecutive I-pictures I1 and I16. In addition, two B-pictures are interspersed between each I-picture and each of its neighboring P-pictures. Two B-pictures are also interspersed between each consecutive P-picture pair. For example, B-pictures B2 and B3 are interspersed between I-picture I1 and P-picture B4, B-pictures B5 and B6 are interspersed between P-pictures P4 and P7, B-pictures B8 and B9 are interspersed between P-pictures P7 and P10, B-pictures B11 and B12 are interspersed between P-pictures P10 and P13, and B-pictures B14 and B15 are interspersed between P-picture P13 and I-picture I16.

The I-pictures are "intra-coded" meaning that they can be restructured without reference to any other picture in the video stream.

The P-pictures are "inter-coded" meaning that they may only be restructured with reference to another reference picture. Typically, the P-picture may include motion vectors that represent estimated motion with respect to the reference picture. The P-picture may be reconstructed using the immediately preceding I-picture or P-picture as a reference. In FIG. 1A, arrows illustrate the predictive relationship between pictures wherein the picture at the head of the arrow indicates the predictive picture, and the picture at the tail of the arrow indicates the reference picture used to reconstruct the predictive picture. For example, the reconstruction of P-picture P7 uses P-picture P4 as a reference.

B-pictures are also inter-coded. The B-picture is typically reconstructed using the immediately preceding I-picture or P-picture as a reference, and the immediately subsequent I-picture or P-picture as a reference. For example, the reconstruction of B-picture B14 uses P-picture P13 and I-picture I16 as references.

Figure 1B:
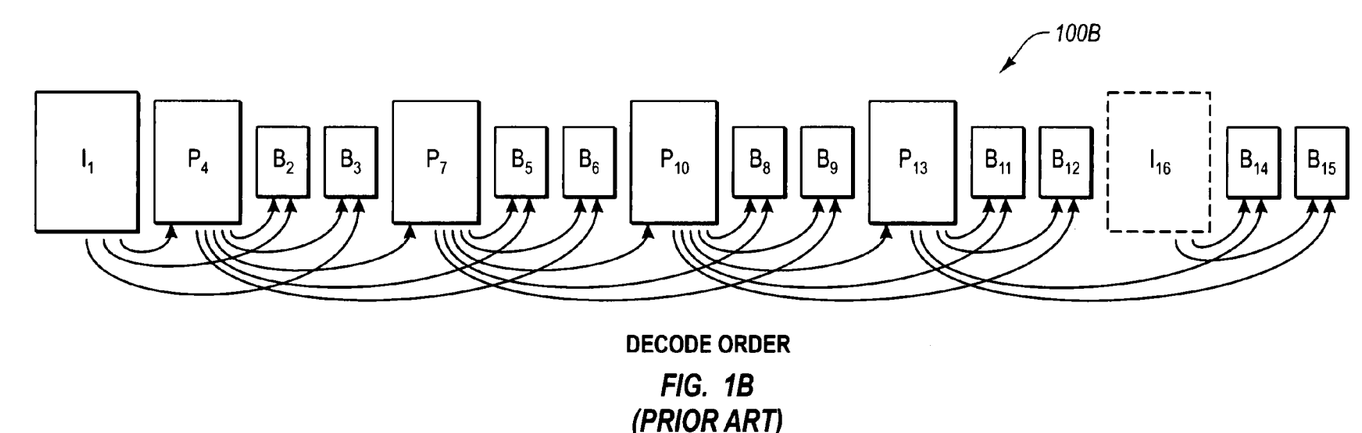
FIG. 1B illustrates a decode order of an MPEG-2 video stream in accordance with the prior art.

FIG. 1B illustrates the decode order 100B of the pictures. The decode order is similar to the display order except that reference frames are decoded prior to any predictive pictures that rely on the reference picture, even if the reference picture is displayed after the predictive picture. Thus, the arrows in FIG. 1B are all rightward facing.

Figure 2A:
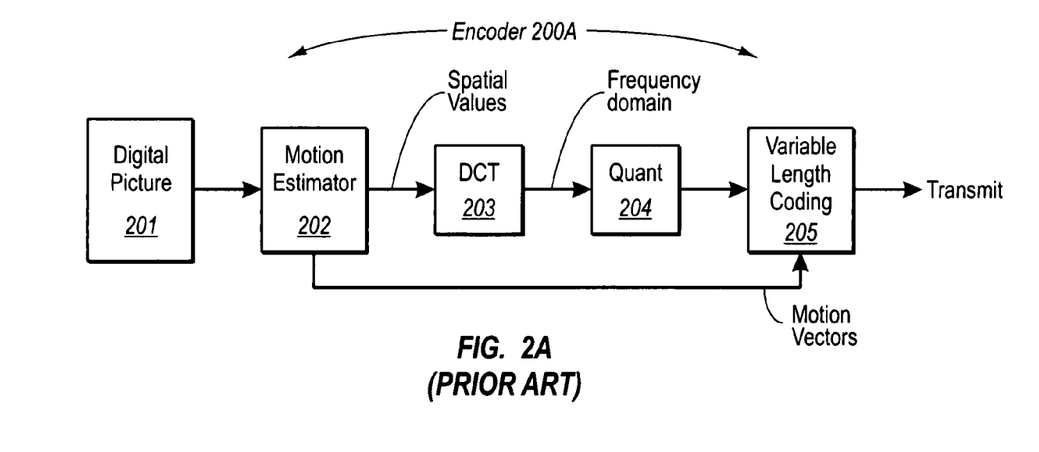
FIG. 2A illustrates an encode sequence in accordance with MPEG-2 and in accordance with the prior art.

FIG. 2A illustrates the general process involved with encoding a digital picture 201 using an encoder 200A that is compatible with the MPEG-2 standard. If the digital picture is to be an I-picture, the digital picture bypasses the motion estimator 202 and is provided to the discrete cosine transformation unit (DCT) 203, which transforms the digital picture, on a block-by-block basis from a spatial representation of an image to a frequency representation of the image. The frequency representation is then passed to a quantization unit 204, which quantizes each frequency, on a macroblock-by-macroblock basis, into definable ranges. A "macroblock" is a 16-pixel by 16-pixel array within the picture. The quantized image is then passed to a variable length coder 205 which performs, for example, variable length Huffman coding on the resulting quantized image. The reduced sized I-picture is then stored or transmitted for subsequent decoding.

If the digital picture 201 is to be a P-picture, the encoding process is similar as for I-pictures with several notable exceptions. If a P-picture, the digital picture is passed first to the motion estimator 202. For each macroblock (i.e., 16×16 pixel array) in the P-picture, the motion estimator 202 finds a close match to the macroblock in the reference picture. The motion estimator 202 then represents the macroblock in the P-picture as a motion vector representing the motion between the macroblock in the P-picture and the close match 16×16 pixel array in the reference picture. In addition to the motion vector, a difference macroblock is calculated representing the difference between the macroblock in the P-picture and the close match 16×16 pixel array in the reference frame. A macroblock represented as a difference with corresponding motion vectors is typically smaller than a macroblock represented without motion vectors. Discrete cosine transformation and quantization are then performed on just the difference representation of the P-picture. Then, the difference information is combined with the motion vectors before variable length coding is performed.

B-pictures are encoded similar to how P-pictures are encoded, except that motion may be estimated with reference to a prior reference picture and a subsequent reference picture.

Figure 2B:
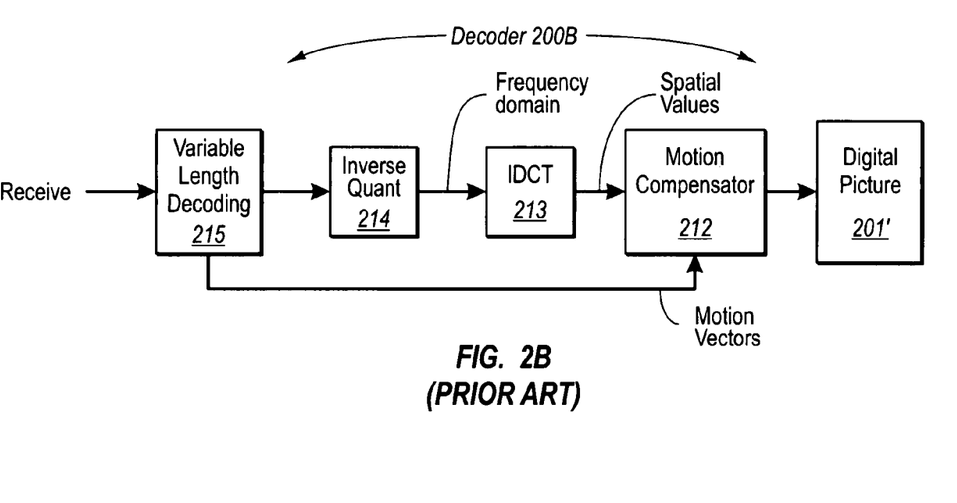
FIG. 2B illustrates a decode sequence in accordance with MPEG-2 and in accordance with the prior art.

FIG. 2B illustrates a conventional decoder 200B in conformance with the MPEG-2 standard. First, a variable length decoder 215 performs, for example, variable length decoding on the picture. The picture (or the difference data of the picture if a P-picture or a B-picture) is passed to the inverse quantizor 214 for inverse quantization on a macroblock-by-macroblock basis. Next, an inverse discrete cosine transformer 213 performs inverse discrete cosine transformation on the frequency representation of the picture, on a block-by-block basis, to reconstruct the spatial representation of the picture. The spatial representation of the picture is passed to the motion compensator 212 where the spatial representation is combined with the motion vectors (if a P-picture or B-picture) to thereby reconstruct the digital picture 201'. The reconstructed digital picture 201' is labeled differently than the original picture 201 to represent that there may be some loss in the encoding process.

In this manner, MPEG-2 combines the functionality of motion compensation, discrete cosine transformation, quantization, and variable length coding to significantly reduce the size of a video stream with some generally acceptable reduction in video quality. Despite conventional standards such as MPEG-2 that provide significant compression to a video stream, it is desirable to reduce the bandwidth requirements of the video stream even more to maximize network and storage performance.

One way to further reduce the bandwidth requirements is to compress the video stream even beyond the compression performed during the original MPEG-2 encoding processes. However, this results in a loss of video information and thus degrades the quality of the video stream to a certain extent. Therefore, what are desired are systems and methods for further compressing a video stream with less, if any, loss of video information.

BRIEF SUMMARY OF THE INVENTION

The present invention extends to both methods and systems for transcoding a video stream so as to reduce the size of the video stream with little, if any, degradation of video quality after subsampling. The video steam includes a number of video pictures such as frames or fields and may be stored in memory or accessed from a transmission. In addition, each video picture includes one or more blocks. These blocks are the fundamental unit upon which subsampling may be performed. For example, under the MPEG-2 standard, developed by the Moving Pictures Experts Group, subsampling may be performed on blocks of 8 pixels by 8 pixels.

The video management system accesses one of the video pictures from the video stream. Then, for at least one block of the video picture, the video management system represents the block as a matrix of pixel values. Then, the block matrix is pre-multiplied by a pre-multiplication matrix and post-multiplied by a post-multiplication matrix. The pre-multiplication matrix is generated from a subsample matrix that represents the subsampled decoding in one direction. The post-multiplication matrix is generated from a subsample matrix that represents the subsampled decoding in a substantially perpendicular direction.

The pre-multiplication matrix and the post-multiplication matrix are structured so that the block of pixels is altered in a manner that subsampling of the altered block of pixels results in the same subsampled image as subsampling of the original block of pixels. The pre-multiplication matrix and the post-multiplication matrix are also designed to decrease the size of the encoded version of the block of pixels.

This strategic altering of blocks of pixels may be repeated for each block in the video picture and for each video picture in the video stream that is to be subject to subsampled decoding. Accordingly, the memory and bandwidth requirements of the video stream may be substantially reduced with the satisfaction that the reduction comes at minimal cost in video quality assuming that the video stream is to ultimately be subsample decoded. In one aspect of the invention, the further compressed video stream is sent to a subsample decoder where it is subsampled and presented on a display device.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Subsampling is a process that reduces the dimensions of a video image such as when the video stream is to be displayed in a reduced-size picture-in-picture display. The present invention extends to both methods and systems for reducing the size of the video stream with minimal, if any, effect on the video quality as displayed after subsampling. A video management system accesses a video stream by receiving the video stream from a video channel, or by accessing a memory where the video stream is stored. Once the video management system determines that only a reduced-size version of the video stream is ultimately to be displayed as when the video stream is to be subject to subsampling, the video management system compresses each picture (e.g., frame or field) of the video frame. Although this compression would cause loss of picture quality if the picture were to be displayed in its full size, this compression is performed in such a manner that there is little, if any, loss in video quality as displayed after subsampling. Any loss in video quality would be primarily due to re-quantization, and finite-precision effects inherent in computer processing.

Embodiments within the scope of the present invention include computer-readable storage media having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable transmission medium. Combinations of the above should also be included within the scope of computer-readable media. Computer-executable instructions comprise, for example, instructions and data which cause a general purpose computer, special purpose computer, or special purpose processing device to perform a certain function or group of functions.

The precise operating environment in which the principles of the present invention are implemented is not important to the present invention. The principles of the present invention may be implemented in any operating environment that is able to implement the principles of the present invention. For example, given suitable software and/or adaptation, general-purpose computers, special-purpose computers or special purpose processing devices (whether now developed or to be developed in the future) might implement the principles of the present invention. In addition, the principles of the present invention may be implemented by software, hardware, firmware or any combination thereof.

Figure 3:
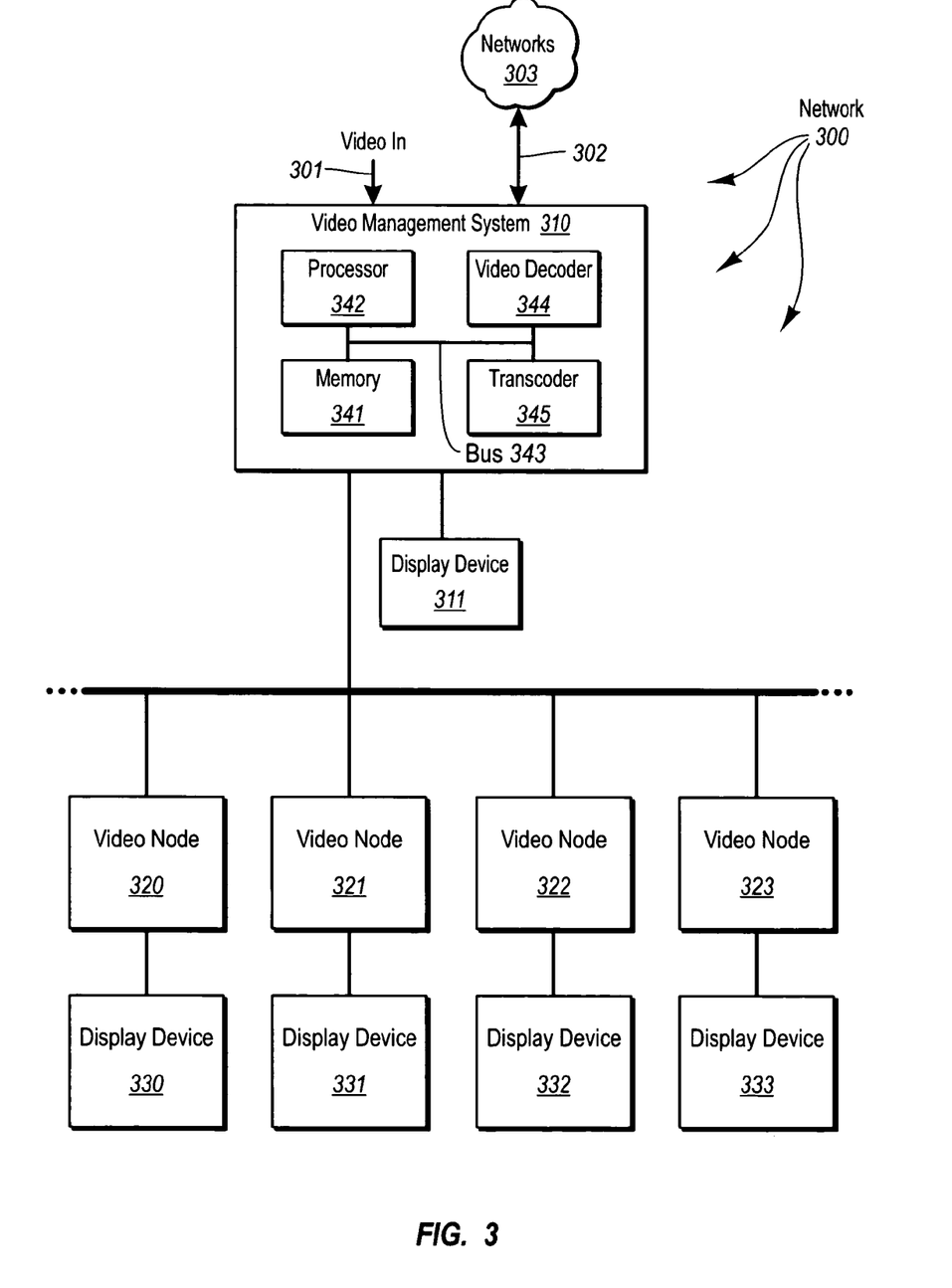
FIG. 3 schematically illustrates a video network in which the principles of the present invention may operate.

As will be described in further detail below, the principles of the present invention are most advantageous when the video processing in accordance with the present invention is followed by subsampling. The environment discussed below with respect to FIG. 3 illustrates just one example of an environment in which subsampling is performed and is provided for illustrative purposes only, and not for purposes of limiting the claims. One of ordinary skill in the art will easily recognize that the principles of the present invention may be implemented in any environment where the video processed in accordance with the present invention is to be subsampled.

FIG. 3 and the corresponding discussion provide a general description of a network 300 in which the present invention may operate. The network 300 includes a management system 310 that receives video input 301, performs appropriate processing on the video, and then distributes the video. The video is distributed either directly to a display device 311 or else to a video node such as one of video nodes 320 through 323, where the video may be subject to further processing, including perhaps subsampling, before being distributed to the corresponding display device 330 through 333. For illustrative purposes, four video nodes are shown although the management system 310 may work with other numbers of video nodes. The management system 310 need not just perform video processing. For example, the management system 310 may also communicate non-video information with networks 303 over link 302 and process the non-video information as well.

The video management system 310 includes a memory 341 that may store the computer-executable instructions described above, and a processor 342 that is coupled to the memory 341 through, for example, a bus 343 so as to be able to execute the computer-executable instructions. The video management system 310 also includes a video decoder 344 that decodes video in accordance with a video decoding standard such as, for example, MPEG. A transcoder 345 operates to reduce the memory and bandwidth requirements of the video 302 and may do such by implementing the principles of the present invention described herein. If the video decoder 344 and the transcoder 345 are implemented at least partially in hardware, the video decoder 344 and the transcoder 345 would be coupled to the bus 343 as shown in FIG. 3. However, as will be apparent to those of ordinary skill in the art, the principles of the present invention may be implemented by hardware, software, or a combination of hardware and software.

While FIG. 3 and the corresponding discussion above provide a general description of a suitable environment in which the invention may be implemented, it will be appreciated that the features of the present invention disclosed herein may be practiced in association with a variety of different system configurations.

Figure 4:
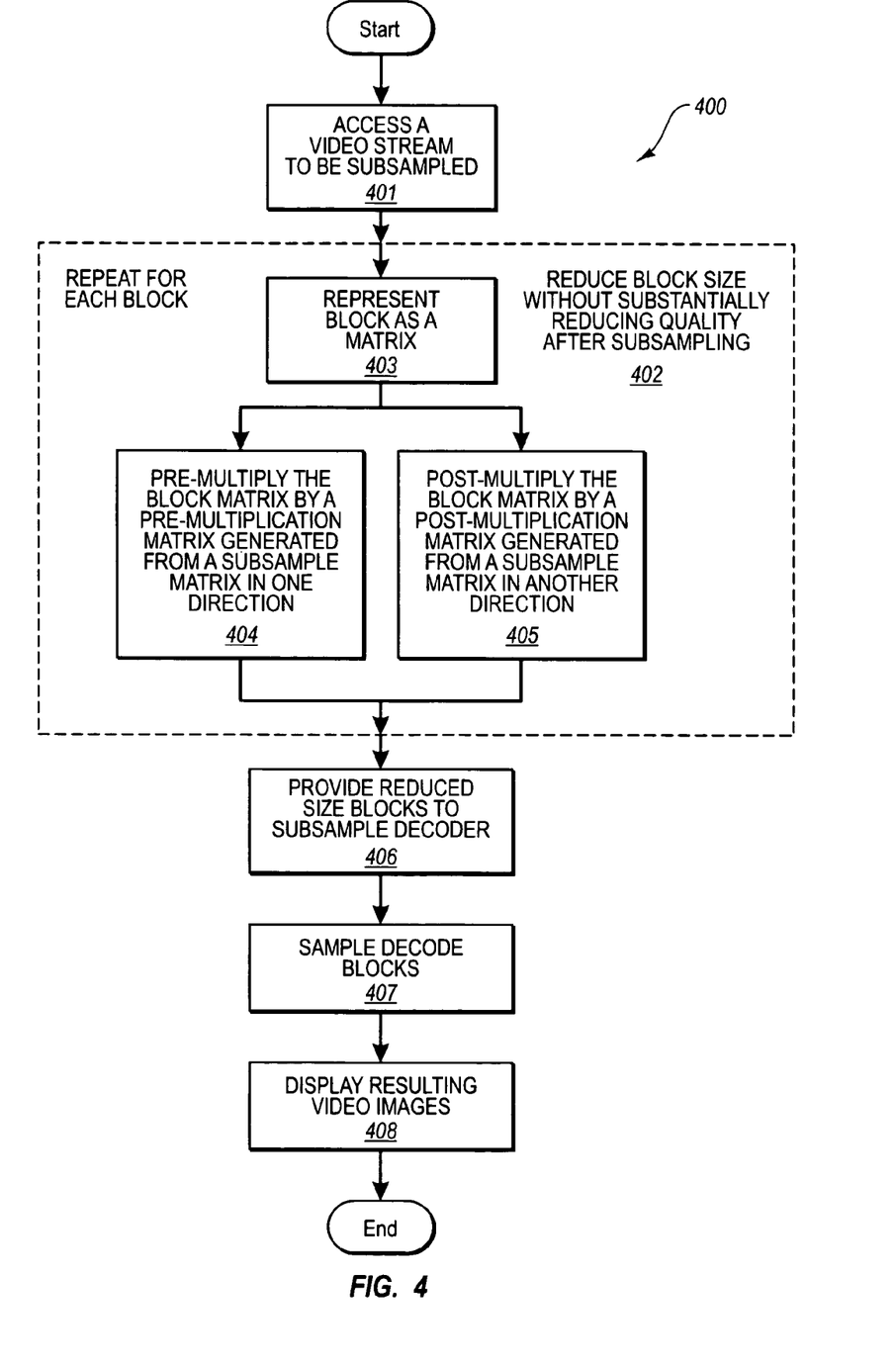
FIG. 4 is a flowchart of a method for transcoding a video stream so that there is little, if any, loss in video quality after subsampling in accordance with the present invention.

FIG. 4 illustrates a method 400 for transcoding a video stream so as to reduce the size of the video picture with minimal, if any, effect on the video quality after subsampling. In the context of FIG. 3, the video management system 310 may perform this transcoding at a given subsampling ratio and then provide the transcoded video stream to one of the video nodes (e.g., video node 320) over video network 300. The video node 320 would then perform subsampled decoding using the same subsampling ratio.

First, the video stream is accessed (act 401). Then, for at least one of the blocks in a video picture of the video stream, the size of the encoded block is reduced without substantially reducing image quality as measure after subsampling (act 402). Preferably, all of the blocks in all of the video pictures in the video stream are compressed when it is known that the video stream is to be ultimately subject to subsampled decoding. The processing of an already encoded video stream (or any already encoded data component for that matter) into a different encoded video stream is often referred to as "transcoding" since the video stream is moved from one encoded state to another. The compression of the encoded video stream to generated a more compressed video stream with minimal, if any, loss in video quality after subsampling is one example of transcoding and will be referred to herein as "subsampled transcoding" although subsampled decoding is still needed after the subsampled transcoding in order to display the reduced size image. In the context of FIG. 3, for example, this subsampled transcoding may be performed by transcoder 345.

In order to generate the reduced size blocks, the block of pixels is represented as a matrix (act 403). The block of pixels may either be represented by a "spatial domain" matrix or by a "transform domain" matrix. A spatial domain matrix of a block of pixels means that the element values of the matrix are specific pixel values that are laid out spatially in the matrix according to the position of the corresponding pixel in the block. Thus, the element in row 3, column 2 of the spatial domain matrix represents a pixel value corresponding to a pixel in row 3, column 2 of the block of pixels. A transform domain matrix of a block of pixels is less intuitive and is represented by performing a transform on the spatial domain matrix. Each element in the transform domain matrix represents a discrete transform relationship between the pixel values in the spatial domain matrix. For example, if the transform domain matrix is a frequency domain matrix, one common discrete frequency relationship is defined by the well-known Discrete Cosine Transform (DCT) operation. Before describing a suitable pre-multiplication matrix and post-multiplication matrix that are suitable for acts 404 and 405, respectively, the mathematical relationship between transform domain matrices and spatial domain matrices will now be briefly described followed by a mathematical description of how subsampling typically occurs.

A transform domain matrix A may be generated by performing pre-multiplication and post-multiplication on a corresponding spatial domain matrix P. This operation is represented in matrix form by the following equation 1:

1:

$$A = D \times P \times E \quad (1)$$

where,

P is the spatial domain matrix corresponding to the transform domain matrix A;

A is the transform domain matrix corresponding to the spatial domain matrix P;

D is the transform matrix for the vertical direction; and

E is the transform matrix for the horizontal direction.

If the spatial domain matrix P is, for example, an 8-by-8 matrix where each element represents a pixel component, the matrices D, E and A are also 8-by-8 matrices. There is no requirement that the matrices D and E be unitary or symmetric. Also there is no requirement that the D and E represent the same transform. In one case, D could represent a Discrete Cosine Transform (DCT) matrix in the vertical direction, while E represents D transpose (i.e., the DCT matrix in the horizontal direction). However, in another example D could represent a wavelet transform matrix in the vertical direction, while D represents the DCT matrix in the horizontal direction.

Conversely, the spatial domain matrix P may be generated from a transform domain matrix by performing an inverse matrix transform on the transform domain matrix. This inverse operation is represented in matrix form by the following equation 2:

$$P = D^{-1} \times A \times E^{-1} \quad (2)$$

Subsampling of the spatial domain matrix P occurs by pre-multiplying the matrix P by a subsampling matrix that defines the subsampling in one direction such as when performing horizontal subsampling. The resulting subsampled matrix may then be post-multiplied by the transpose of another subsampling matrix that defines the subsampling in a substantially perpendicular direction as when performing vertical subsampling. This subsampling is performed on the spatial domain matrix P as illustrated by the following equation 3:

$$p = S \times P \times T' \quad (3)$$

where, p is the subsampled spatial domain matrix of the spatial domain matrix P;

S is the subsampling matrix that is used for horizontal subsampling; and

T' is the transpose of the subsampling matrix T that is used for vertical subsampling.

Rewriting equation 3 by substituting the value of matrix P from equation 2 results in the following equation 4:

$$p = S \times D^{-1} \times A \times E^{-1} \times T' \quad (4)$$

Each of these matrices may conceptually be split into four separate quadrants based on the subsample size. For example, the matrix A may be rewritten as the following equation 5:

$$A = \begin{bmatrix} A_{TL} & A_{TR} \\ A_{BL} & A_{BR} \end{bmatrix} \quad (5)$$

where, $A_{TL}$ is a matrix component having a size that is proportional to the matrix A by the same ratio as the proportion of the subsampled picture to the original picture;

$A_{TR}$ is a matrix component that resides to the right of the matrix $A_{TL}$;

$A_{BL}$ is a matrix component that resides below the matrix $A_{TL}$; and $A_{BR}$ is a matrix component that resides below the matrix $A_{TR}$ and to the right of the matrix $A_{BL}$.

Similarly, the top two components of the matrix may be combined and the bottom two components may be combined so that the matrix A is defined as in the following equation 6:

$$A = \begin{bmatrix} A_T \\ A_B \end{bmatrix} \quad (6)$$

where, $A_T$ is a matrix component defined by the combination of $A_{TL}$ and $A_{TR}$; and $A_B$ is a matrix component defined by the combination of $A_{BL}$ and $A_{BR}$.

For instance, if the matrix A is an 8 row by 8 column matrix, and the subsampling cuts each dimension size (horizontal and vertical) in half, the matrix component ATL would be a 4 row by 4 column matrix. Consequently, the other matrix components ATR, ABL, and ABR would also be 4 row by 4 column matrices. In this case, the matrix components AT and AB would each be 4 rows by 8 columns. This subsample ratio is used as an example in the following description although the present invention works with other subsampling ratios. For example, if the picture were subsampled by 75%, each 8 row by 8 column matrix would be reduced to a mere 2 row by 2 column matrix. In this latter case, the matrix component ATL would be a 2 row by 2 column matrix. Consequently, the matrix components ATR would be a 2 row by 6 column matrix, the matrix component ABL would be a 6 row by 2 column matrix, and the matrix component ABR would be a 6 row by 6 column matrix. In this case, the matrix component AT would be two rows by eight columns and the matrix component AB would be 6 rows by 8 columns. Subsampling may also occur in just one direction, horizontal or vertical, with no subsampling occurring in the other direction.

Thus, the size of the matrix components is important for the transcoder to know when performing the subsample transcoding in accordance with the present invention since the subsampling ratio used to perform subsample transcoding by the transcoder 345 should be the same as the subsampling ratio used to perform subsampled decoding at the video node 320. This knowledge may be inferred by the transcoder 440. For example, if the video stream corresponds to the reduced-size image of a picture-in-picture display, the reduced size image may always be a certain size (e.g., half the size for each dimension). Thus, the transcoder 440 may infer that if sub-sampled decoding is to occur at all, it is at a subsampling ratio of 50% in each direction.

Referring to FIG. 3, the video node (e.g., video node 320) that is to display the reduced size image informs the management system 310 via network 300 the identity of any channel for which a reduced size video image is desired. If the transcoder 345 cannot accurately infer the subsampling ratio (e.g., a user may be able to adjust the size of the picture-in-picture image), the video node 320 also informs the video management system of the appropriate subsampling ratio that is to be performed at the video node.

In accordance with the principles of the present invention, the transform domain matrix A is converted into a matrix a that has zero values in all but its upper left component aTL. Specifically, matrix a may be represented by the following equation 7.

$$a = \begin{bmatrix} a_{TL} & Z \\ Z & Z \end{bmatrix} \quad (7)$$

where,

Z represents matrix components having zero values for all elements.

Since the matrix a has many zero values, coding methods such as Huffman variable length coding reduce the coded representation of the matrix a significantly as compared to the coded representation of the matrix A. Thus, the size of the coded video stream is significantly reduced when converting matrix A to the matrix a for each block in each picture of the video stream.

In accordance with the principles of the present invention, the matrix A is converted into the matrix a in such a manner that subsampled decoding of the matrix a results in the same pixel block (i.e., matrix p defined by equation 4) as sub-sampled decoding the matrix A. Specifically, the following equation 8 holds true:

$$S \times D^{-1} \times A \times E^{-1} \times T' = S \times D^{-1} \times a \times E^{-1} \times T' \quad (8)$$

As mentioned above, the matrix a only has the potential for non-zero elements in its upper left matrix component aTL. Thus, once one determines what the matrix component aTL should be, one has also determined what the matrix a should be. The inventors have discovered that an appropriate matrix component aTL that will cause equation 8 to be satisfied so that subsampled decoding of the matrix a results in substantially the same picture as subsampled decoding of the matrix A is defined by the following equation 9:

$$a_{TL} = (m1)^{-1} \times S \times P \times T' \times (n1)^{-1} \quad (9)$$

In equation 9, the matrix $(m1)^{-1} \times S$ represents an example of the pre-multiplication matrix that the block matrix P is pre-multiplied by in act 404 of FIG. 4. The matrix $T' \times (n1)^{-1}$ represents an example of a post-multiplication matrix that the block matrix P is post-multiplied by in act 405 of FIG. 4.

In equation 9, the matrix P represents the spatial domain representation of a block of pixels and, in a typical example, is an 8 row by 8 column matrix.

The matrix S is the vertical subsampling matrix. For example, if each dimension of the picture is cut in half when subsampling, and the block P has 8 rows, the matrix S would be a 4 row by 8 column matrix.

The matrix T' is the transpose of the matrix T. The matrix T is the horizontal subsampling matrix. For example, if each dimension of the picture is cut in half when subsampling, and the block P has 8 columns, the matrix T' would be an 8 row by 4 column matrix.

The matrix $(m1)^{-1}$ is the multiplication inverse of matrix m1 such that $(m1)^{-1} \times m1 = I$ where "I" is the identity matrix. Matrix m1 equals $S \times (D-1)$left, where (D-1)left is the left portion of the inverse of D. As an illustrative but non-limiting example of the dimension of m1, if S is a four row by eight column matrix and (D-1)left is an eight row by four column matrix, the matrix m1 and the matrix $(m1)^{-1}$ are both four row by four column matrices.

The matrix $(n1)^{-1}$ is the multiplication inverse of matrix n1 such that $(n1)^{-1} \times n1 = I$ where "I" is the identity matrix. Matrix n1 equals $(E-1)$top$\times T'$. As an illustrative but non-limiting example of the size of n1, if (E-1)top is a four row by eight column matrix and T' is an eight row by four column matrix, the matrix n1 and the matrix $(n1)^{-1}$ are both four row by four column matrices.

The dimension of the resulting pre-multiplication matrix $(m1)^{-1} \times S$ by which the matrix P is pre-multiplied according to equation 9 is obtained as follows. The number of rows in this matrix is equal to the number of rows in S and the number of columns in this matrix is equal to the number of rows in P (the latter typically being 8).

The dimension of the resulting post-multiplication matrix $T' \times (n1)^{-1}$ by which the matrix P is post-multiplied according to equation 9 is obtained as follows. The number of rows in this matrix is equal to the number of columns in P (which is typically 8), and the number of columns is equal to the number of rows in T.

To continue with the illustrative but non-limiting example of the dimensions of the matrices involved, in this example, equation 9 results in the pre-multiplication of an eight row by eight column matrix by a four row by eight column pre-multiplication matrix, and in the post-multiplication of the eight row by eight column matrix by an eight row by four column pre-multiplication matrix. In this example, the result is a four row by four column matrix that constitutes the potential non-zero values of the eight row by eight column matrix a.

Referring to FIG. 4, after the subsample transcoding is completed for each block, variable length coding is performed on the blocks and then the transcoded video is either stored for future subsampled decoding, or the transcoded video is provided to the subsample decoder (act 406). In the context of FIG. 3, the video management system 310 may either store the video stream in memory 341, or else may provide the video stream to another component external to the video management system 310.

Since the transcoded video stream is smaller after variable length coding than the original encoded video stream, less memory is required to store the video stream if the video stream is stored. Also, less network bandwidth is required to transmit the video stream if the video stream is transmitted over the network. According, the memory and network bandwidth needed to handle the video stream are reduced. The subsample transcoding described above would result in a loss of image quality if subsampled decoding was not to occur. However, if it is known that the video stream is to ultimately be subsample decoded, the video stream may be subsampled transcoded in accordance with the present invention with the assurance that the subsampled transcoding will result in no lost image quality after subsampled decoding. Accordingly, although some additional processing is required to perform the subsampled transcoding, the principles of the present invention allow for reduced memory and bandwidth requirements with no cost in terms of loss of video quality after subsampled transcoding.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a video management system configured to receive a video stream containing one or more video pictures that are each divided into blocks, wherein the video management system is to provide a representation of the one or more video pictures to a subsample decoder for subsampling, a method of reducing the size of the one or more frames with minimal, if any, effect on the video quality generated from the one or more frames after subsampling, the method comprising the following:
   accessing a video picture that is to be provided to a video node having a subsample decoder;
   obtaining information specifying a subsampling ratio to be performed by the subsample decoder; and
   in response to the obtained information, for at least one block of the video picture, performing subsample transcoding of the at least one block, thereby reducing the size of the at least one block to generate at least one reduced size block in such a way that subsampled decoding the at least one reduced size block results in substantially the same reduced size image as subsampled decoding the at least one block prior to the subsample transcoding, wherein reducing the size of the block includes the following:
   representing the block as a matrix;
   pre-multiplying the block matrix by a pre-multiplication matrix, the pre-multiplication matrix generated from a first subsample matrix that represents the subsampled decoding in a first direction; and
   post-multiplying the block matrix by a post-multiplication matrix generated from a second subsample matrix that represents the subsampled decoding in a second direction that is substantially perpendicular to the first direction.

2. The method in accordance with claim 1, wherein the method further comprises the following:
   providing the video picture with its one or more reduced size blocks to the subsample decoder.

3. The method in accordance with claim 1, wherein the method further comprises the following:
   subsampled decoding the video picture.

4. The method in accordance with claim 3, wherein the method further comprises the following:
   displaying the subsample decoded video picture on a display device.

5. The method in accordance with claim 3, further comprising the following:
   displaying the subsample decoded video picture on a display device as a reduced sized picture of a picture-in-picture display.

6. A computer system comprising a processor and storage media storing computer-executable instructions which, when executed, perform the method recited in claim 1.

7. The method of claim 1, further comprising:
   receiving an indication over a network that the subsample decoder is to operate on the video stream.

8. The method of claim 1, further comprising:
   receiving the first and second subsample matrix over a network from the subsample decoder.

9. The method of claim 1, wherein the first subsample matrix is a vertical subsample matrix that represents the vertical subsampling that is to be performed by the subsample decoder, and wherein the second subsample matrix is a horizontal subsample matrix that represents the horizontal subsampling that is to be performed by the subsample decoder, the method further comprising the following:
   generating the pre-multiplication matrix by performing the following:
   determining a first inverse matrix that represents the multiplication inverse of a matrix that results from the multiplication of a first transform matrix times the vertical subsampling matrix; and
   multiplying the first inverse matrix by the vertical subsampling matrix to generate the pre-multiplication matrix.

10. The method in accordance with claim 9, wherein determining a first inverse matrix that represents the multiplication inverse of a matrix that results from the multiplication of a first transform matrix times the vertical subsampling matrix comprises the following:
    determining a first inverse matrix that represents the multiplication inverse of a matrix that results from the multiplication of a vertical discrete cosign transform matrix times the vertical subsampling matrix.

11. The method in accordance with claim 9, wherein determining a first inverse matrix that represents the multiplication inverse of a matrix that results from the multiplication of a first transform matrix times the first subsampling matrix comprises the following:
    determining a first inverse matrix that represents the multiplication inverse of a matrix that results from the multiplication of a vertical wavelet transform matrix times the first subsampling matrix.

12. The method in accordance with claim 9, further comprising the following:
    generating the post-multiplication matrix by performing the following:
    determining a second inverse matrix that represents the multiplication inverse of a matrix that results from the multiplication of a second transform matrix times the transpose of the horizontal subsampling matrix; and
    multiplying the transpose of the horizontal subsampling matrix by the second inverse matrix to generate the post-multiplication matrix.

13. The method in accordance with claim 12, wherein determining a second inverse matrix that represents the multiplication inverse of a matrix that results from the multiplication of a second transform matrix times the horizontal subsampling matrix comprises the following:
    determining a second inverse matrix that represents the multiplication inverse of a matrix that results from the multiplication of a horizontal discrete cosign transform matrix times the horizontal subsampling matrix.

14. The method in accordance with claim 12, wherein determining a second inverse matrix that represents the multiplication inverse of a matrix that results from the multiplication of a second transform matrix times the horizontal subsampling matrix comprises the following:
    determining a second inverse matrix that represents the multiplication inverse of a matrix that results from the multiplication of a horizontal wavelet transform matrix times the horizontal subsampling matrix.

15. The method in accordance with claim 12, further comprising the following:
horizontal subsampling the video picture using the horizontal subsampling matrix; and
vertical subsampling the video picture using the vertical subsampling matrix.

16. The method in accordance with claim 1, wherein the at least one block of the video picture comprises all the blocks in the video picture.

17. The method in accordance with claim 1, wherein the act of accessing a video picture that is to be subsampled comprises the following:
accessing a video frame that is to be subsampled.

18. The method in accordance with claim 1, wherein the act of accessing a video picture that is to be subsampled comprises the following:
accessing a video frame that is to be subsampled.

19. A method as recited in claim 1, wherein the information specifying the subsampling ratio is provided by the video node.

20. A method as recited in claim 19, wherein the information specifying the subsampling ratio is provided upon determining that the subsampling ratio cannot be inferred.

21. A method as recited in claim 1, wherein the information specifying the subsampling ratio corresponds to a reduced-size in which the video picture will be displayed by the video node.

22. A method as recited in claim 1, wherein subsampled decoding of the at least one block causes the video image to be rendered without image loss that would otherwise occur if the image were to be rendered without the subsampled decoding.

23. A computer-readable storage media having stored computer-executable instructions for implementing a method in a video management system configured to receive a video stream containing one or more video pictures that are each divided into blocks, wherein the video management system is to provide a representation of the one or more video pictures to a subsample decoder for subsampling, wherein the method is for reducing the size of the one or more frames with minimal, if any, effect on the video quality generated from the one or more frames after subsampling, the method comprising the following:
accessing a video picture that is to be provided to a video node having a subsample decoder;
obtaining information specifying a subsampling ratio to be performed by the subsample decoder; and
in response to the obtained information, for at least one block of the video picture, performing subsample transcoding of the at least one block, thereby reducing the size of the at least one block to generate at least one reduced size block in such a way that subsampled decoding the at least one reduced size block results in substantially the same reduced size image as subsampled decoding the at least one block prior to the subsample transcoding, wherein reducing the size of the block includes the following:
representing the block as a matrix:
pre-multiplying the block matrix by a pre-multiplication matrix, the pre-multiplication matrix generated from a first subsample matrix that represents the subsampled decoding in a first direction; and
post-multiplying the block matrix by a post-multiplication matrix generated from a second subsample matrix that represents the subsampled decoding in a second direction that is substantially perpendicular to the first direction.

* * * * *

UNITED STATES PATENT AND TRADEMARK OFFICE
CERTIFICATE OF CORRECTION

| | | |
|---|---|---|
| PATENT NO. | : 7,627,038 B2 | Page 1 of 1 |
| APPLICATION NO. | : 10/968529 | |
| DATED | : December 1, 2009 | |
| INVENTOR(S) | : Shankar Moni et al. | |

It is certified that error appears in the above-identified patent and that said Letters Patent is hereby corrected as shown below:

In column 14, line 24, in Claim 23, after "matrix" delete ":" and insert -- ; --, therefor.

Signed and Sealed this
Eighteenth Day of January, 2011

David J. Kappos
*Director of the United States Patent and Trademark Office*